US008433655B2

(12) United States Patent
Qu

(10) Patent No.: US 8,433,655 B2
(45) Date of Patent: Apr. 30, 2013

(54) SOFTWARE INSTALLATION SYSTEM AND METHOD

(75) Inventor: Kai-Bo Qu, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 872 days.

(21) Appl. No.: 12/565,887

(22) Filed: Sep. 24, 2009

(65) Prior Publication Data

US 2010/0153944 A1    Jun. 17, 2010

(30) Foreign Application Priority Data

Dec. 16, 2008    (CN) .......................... 2008 1 0306286

(51) Int. Cl.
*G06F 21/31*    (2006.01)
(52) U.S. Cl.
USPC ............................................. 705/51; 705/64
(58) Field of Classification Search ............... 705/50–79
See application file for complete search history.

(56) References Cited

U.S. PATENT DOCUMENTS

| 6,871,012 | B1 * | 3/2005 | Evans ........................... 386/244 |
| 7,757,945 | B2 * | 7/2010 | Gray et al. ..................... 235/383 |
| 2002/0026478 | A1 * | 2/2002 | Rodgers et al. ............... 709/205 |
| 2002/0177362 | A1 * | 11/2002 | Chang ........................... 439/638 |
| 2008/0147530 | A1 * | 6/2008 | Kwan et al. ..................... 705/34 |
| 2009/0106110 | A1 * | 4/2009 | Stannard et al. ................ 705/14 |
| 2010/0017503 | A1 * | 1/2010 | Kim et al. ..................... 709/219 |

FOREIGN PATENT DOCUMENTS

CN    101119387 A    2/2008

* cited by examiner

*Primary Examiner* — Evens J Augustin
(74) *Attorney, Agent, or Firm* — Altis Law Group, Inc.

(57) ABSTRACT

A software installation system and method using a first mobile electronic device and a second mobile electronic device records an installation record of a software application of the first mobile electronic device and generates an installation list of the software application. The system and method further transmits the installation list to a server, and accesses the installation list by a second mobile electronic device and sends a request to the server for installing the software application. Furthermore, the system and method transmits the installation file to the second mobile electronic device, in response to the determination that the software application is available at no cost, and installs the software application in the second mobile electronic device according to the installation file and the installation record.

10 Claims, 3 Drawing Sheets

SOFTWARE INSTALLATION SYSTEM AND METHOD

BACKGROUND

1. Technical Field

Embodiments of the present disclosure are related to electronic device management systems and methods, and particularly to a software application installation system and method for using mobile electronic device to install the software application in another mobile electronic device.

2. Description of Related Art

An input method is an operating system component or program that allows users to enter characters and symbols not found on their input device. For instance, on the computer, this allows the user of keyboards to input Chinese, Japanese, Korean and Indic characters. On a mobile phone, this allows user using the keypad to enter Latin alphabet characters. Currently, a mobile electronic device may be provided with many advanced features, such as e-mail, Internet, e-book reader capabilities, game, or global position system (GPS) navigation, for example. Usually, the mobile electronic device is installed with a software application corresponding to the feature. For example, if a user wants to use the mobile electronic device for navigation, the mobile electronic device should have a GPS software application installed. However, at present, the software application cannot be installed in the mobile electronic device using another mobile electronic device, but must be downloaded from the Internet or from a computer, which can be very inconvenient.

Therefore, there is a need for a system and method to overcome the aforementioned problem.

DETAILED DESCRIPTION

All of the processes described may be embodied in, and fully automated via, functional code modules executed by one or more general purpose computers or processors. The code modules may be stored in any type of computer-readable medium or other storage device. Some or all of the methods may alternatively be embodied in specialized computer hardware or electronic apparatus.

Figure 1:
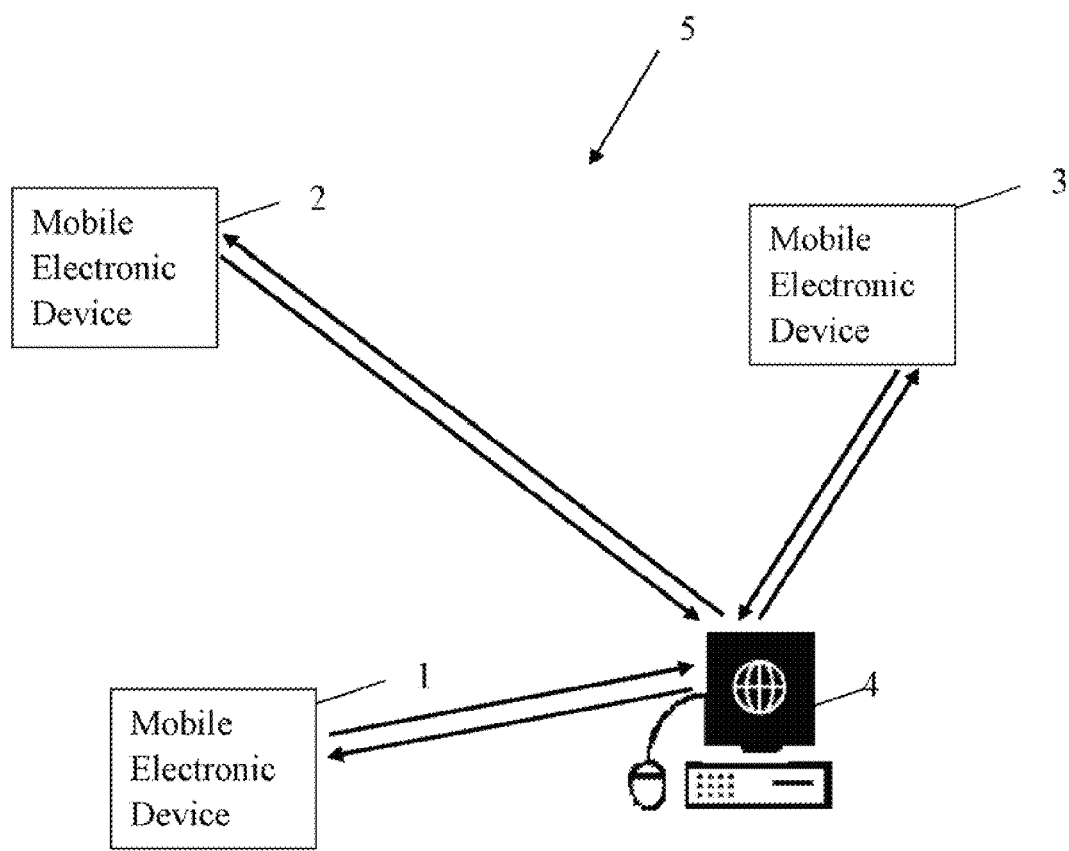
FIG. 1 is a block diagram of one embodiment of a system for installing a software application.

FIG. 1 is a block diagram of one embodiment of a system 5 for installing a software application. In one embodiment, the system 5 may comprise a server 4, and one or more mobile electronic devices 1, 2, and 3 (only three shown). In one embodiment, the server 4 may be a personal computer (PC), a network server, or other appropriate data-processing equipment. Depending on the embodiment, each of the mobile electronic devices 1, 2, and 3 may be a mobile phone, a personal digital assistant (PDA), or any other portable electronic device with a communication function. The mobile electronic devices 1, 2, and 3 establish a communication connection with the server 4 using a wireless connection, such as a WI-FI connection, a wireless application protocol (WAP), or a general packet radio service (GPRS) for mobile communication network.

Figure 2:
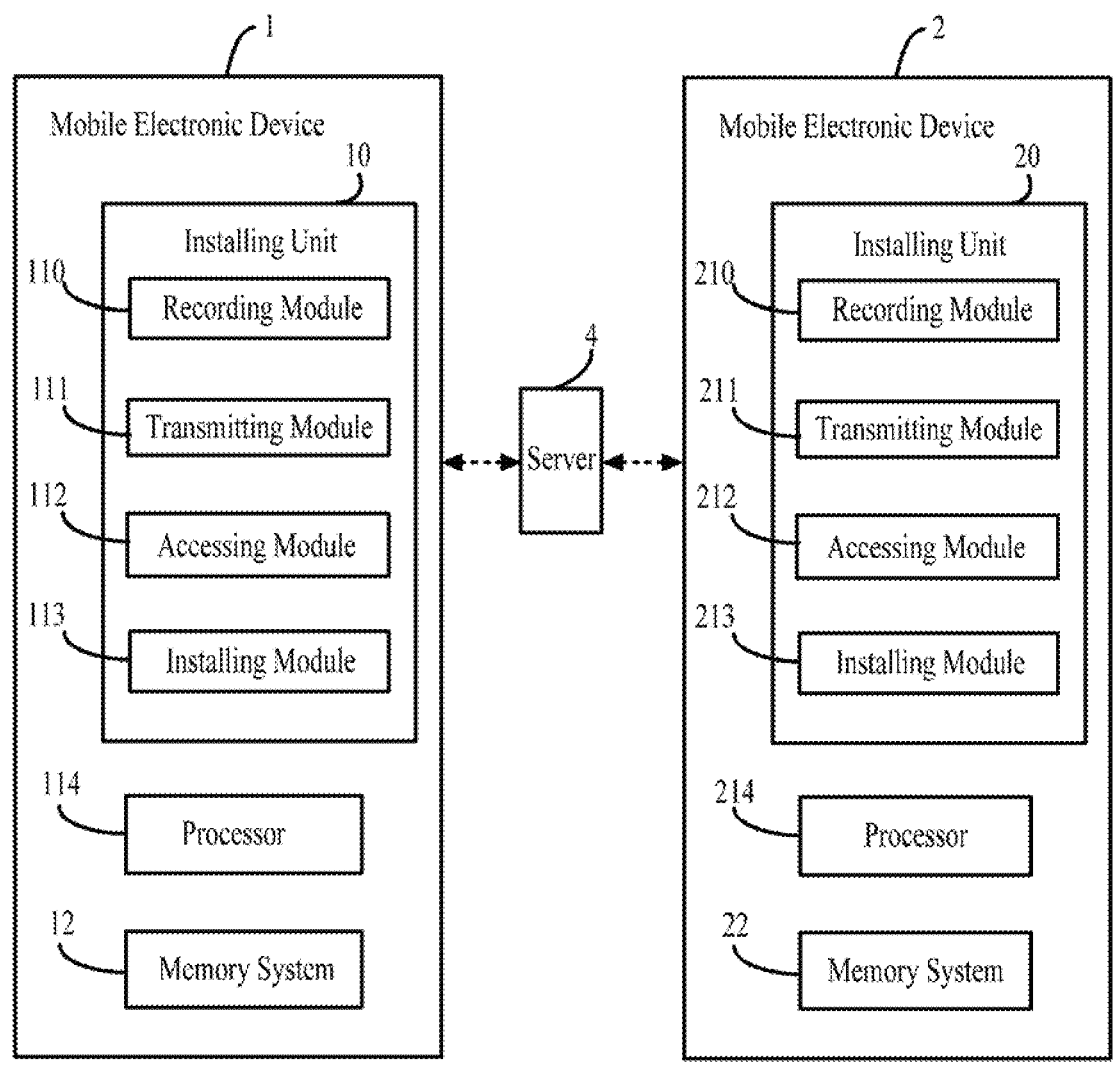
FIG. 2 is a flowchart of one embodiment of an installing unit of a mobile electronic device.

FIG. 2 is a block diagram of one embodiment of an installing unit 10 of a mobile electronic device 1. For ease of understanding, the following description uses just the mobile electronic device 1 and the mobile electronic device 2 as an example. The installing unit 10 may be used to install a software application included in a memory system 12 of the mobile electronic device 1 and in a memory system 22 of the mobile electronic device 2. The software application may be free software or commercial software. For example, the software application may be the GNU image manipulation program (GIMP), if the software application is free software. Depending on the embodiment, the mobile electronic device 1 and the mobile electronic device 2 are installed with the same components having the same functions, such as installing units 10, 20, processors 114, 214 and memory systems 12, 22 correspondingly.

The memory system (12, 22) store one or more programs, such as computerized codes of the installing unit (10, 20), programs of an operating system, and other applications. The memory system (12, 22) may be an internal memory system card or an external memory system card, such as a smart media card (SMC), a secure digital card (SDC), a compact flash card (CFC), a multi media card (MMC), a memory system stick (MS), an extreme digital card (XDC), or a trans flash card (TFC).

In one embodiment, the installing unit 10, 20 includes a recording module 110, 210, a transmitting module 111, 211, an accessing module 112, 212, and an installing module 113, 213. One or more computerized codes of the mentioned modules are stored in the installing unit 10, 20. One or more general purpose or specialized processors, such as a processor 114, 214 executes the computerized codes of the mentioned modules to provide one or more operations of the mobile electronic device 1 and the mobile electronic device 2.

The recording module 110 is operable to record an installation record of a software application of the mobile electronic device 1 and generate an installation list of the software application in the mobile electronic device 1. In one embodiment, the installation record comprises a system file of the software application, a system configuration file of the software application, and startup items of the software application. The installation record may be, but not limited to, stored as a text (TXT) file or an extensible markup language (XML) file. The installation list of the software application comprises a serial number of the mobile electronic device 1, a name of the software application and version information of the software application.

The transmitting module 111 is operable to transmit the installation list of the software application from the mobile electronic device 1 to the server 4. In one embodiment, the transmitting module 111 wirelessly transmits the installation list of the software application from the mobile electronic device 1 to the server 4.

The accessing module 212 is operable to access the installation list of the software application by the mobile electronic device 2 and send a request to the server 4 for installing the software application.

The transmitting module 111 is further operable to transmit an installation file of the software application from the mobile electronic device 1 to the mobile electronic device 2. In one embodiment, the transmitting module 111 transmits the installation file of the software application from the mobile electronic device 1 to the mobile electronic device 2 using a multimedia short message.

The installing module 213 is operable to install the software application in the mobile electronic device 2 according to the installation file of the software application and the installation record of the software application. In one embodiment, the installing module 213 automatically installs the software application if the mobile electronic device 2 receives the installation file of the software application.

Figure 3:
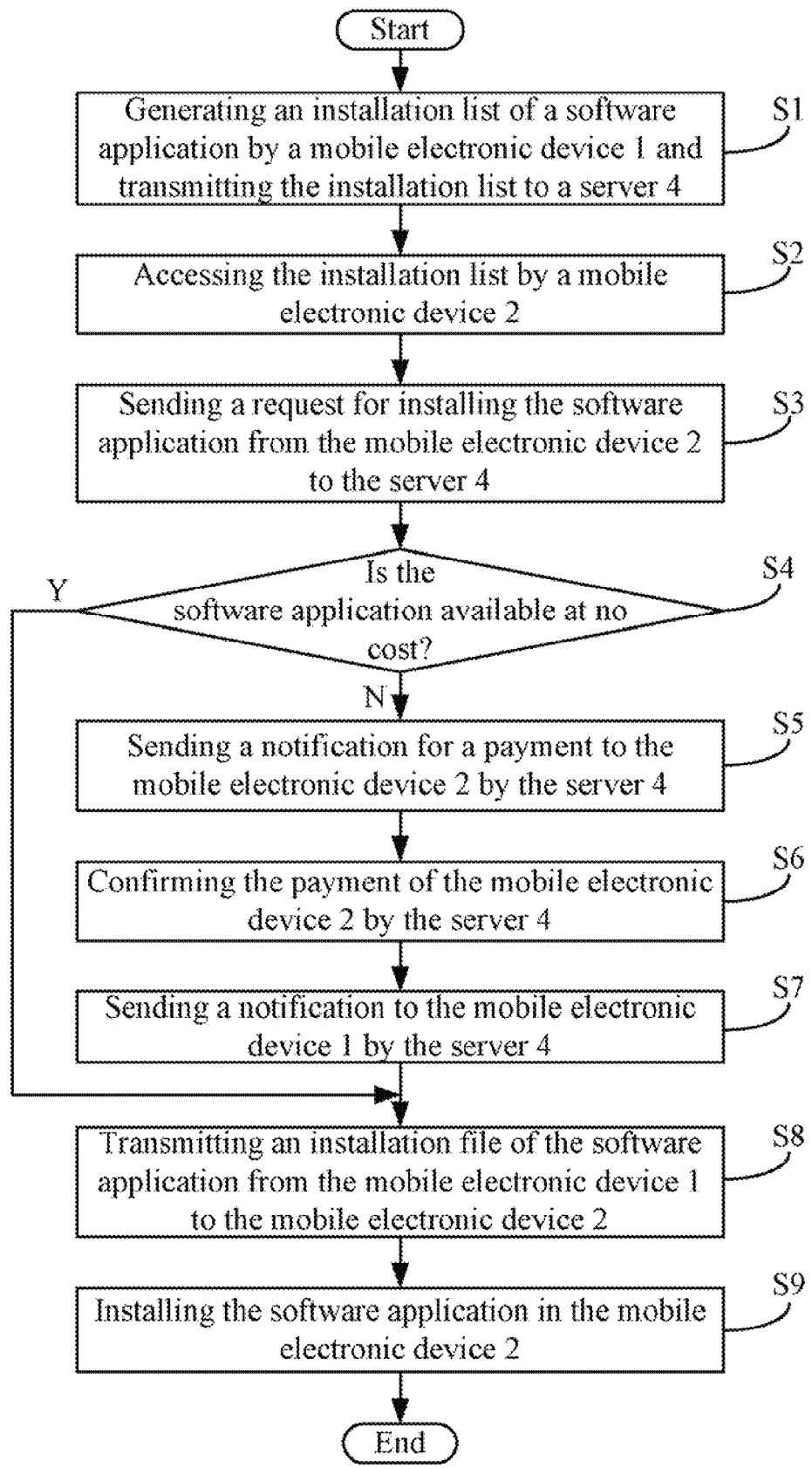
FIG. 3 is a flowchart of one embodiment of a method for installing a software application.

FIG. 3 is a flowchart of one embodiment of a method for installing a software application using the mobile electronic device 1 and the mobile electronic device 2. Depending on the embodiment, additional blocks may be added, while others deleted, and the blocks may also be executed in a different order than described.

In block S1, the recording module 110 records an installation record of a software application of the mobile electronic device 1, then the recording module 110 generates an installation list of the software application in the mobile electronic device 1. The transmitting module 111 transmits the installation list of the software application from the mobile electronic device 1 to the server 4. As mentioned above, the installation record comprises a system file of the software application, a system configuration file of the software application, and startup items of the software application. The installation record may, but not limited to, be stored into a text (TXT) file or an extensible markup language (XML) file. The installation list of the software application comprises a serial number of the mobile electronic device 1, a name of the software application and version information of the software application.

In block S2, the accessing module 212 accesses the installation list of the software application by the mobile electronic device 2.

In block S3, the accessing module 212 sends a request for installing the application software to the server 4.

In block S4, the server 4 determines if the software application is available at no cost (e.g. free). One such software application may be an image editing program, such as the GIMP, for Linux based computers. If the server determines that the software application is available at no cost, then the procedure goes to block S8. Otherwise, the procedure goes to block S5.

In block S5, the server 4 wirelessly sends a notification for a payment to the mobile electronic device 2.

In block S6, the mobile electronic device 2 sends a feedback to the server 4 to confirm the payment.

In block S7, the server 4 sends a notification to the mobile electronic device 1, wherein the notification indicates the mobile electronic device 2 has paid for the software application.

In block S8, the transmitting module 111 transmits an installation file of the software application from the mobile electronic device 1 to the mobile electronic device 2. For example, the transmitting module 111 transmits the installation file of the GIMP from the mobile electronic device 1 to the mobile electronic device 2 using a multimedia short message.

In block S9, the installing module 213 installs the software application in the mobile electronic device 2 according to the installation file of the software application and the installation record of the software application. In one embodiment, the installing module 213 automatically installs the GIMP if the mobile electronic device 2 receives the installation file of the GIMP.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A software installation system using a first mobile electronic device and a second mobile electronic device, the system comprising:
    a hardware processor;
    a non-transitory computer-readable storage memory system having computer code stored thereon that, when executed by the hardware processor, causes the hardware processor to perform the operation of:
    recording an installation record of a software application of the first mobile electronic device and generating an installation list of the software application in the first mobile electronic device, wherein the installation list comprises a serial number of the first mobile electronic device, a name of the software application and version information of the software application;
    transmitting the installation list of the software application from the first mobile electronic device to a server;
    accessing the installation list of the software application by the second mobile electronic device and sending a request for installing the software application from the second mobile electronic device to the server;
    determining by the server if the software application is available at no cost;
    wirelessly sending a notification for a payment to the second mobile electronic device, in response to the determination that the software application is not available at no cost;
    sending a feedback by the second mobile electronic device to the server to confirm the payment;
    sending a notification to the first mobile electronic device by the server, wherein the notification indicates the second mobile electronic device has paid for the software application;
    transmitting an installation file of the software application from the first mobile electronic device to the second mobile electronic device; and
    installing the software application in the second mobile electronic device according to the installation file of the software application and the installation record of the software application.

2. The system of claim 1, wherein the installation record comprises a system file of the software application, a system configuration file of the software application, and startup items of the software application.

3. The system of claim 1, wherein each of the first mobile electronic device and the second mobile electronic device is a mobile phone or a personal digital assistant (PDA).

4. The system of claim 1, wherein the memory system is selected from the group consisting of a smart media card (SMC), a secure digital card (SDC), a compact flash card (CFC), a multi media card (MMC), a memory system stick (MS), an extreme digital card (XDC), and a trans flash card (TFC).

5. A software installation method using a first mobile electronic device and a second mobile electronic device, the method comprising:
    (a) recording an installation record of a software application of the first mobile electronic device and generating an installation list of the software application in the first mobile electronic device, wherein the installation list comprises a serial number of the first mobile electronic device, a name of the software application and version information of the software application;
    (b) transmitting the installation list of the software application from the first mobile electronic device to a server;

(c) accessing the installation list of the software application in the server by the second mobile electronic device;
(d) sending a request for installing the software application from the second mobile electronic device to the server;
(e) determining by the server if the software application is available at no cost;
(f) wirelessly sending a notification for a payment to the second mobile electronic device, in response to the determination that the software application is not available at no cost;
(g) sending a feedback by the second mobile electronic device to the server to confirm the payment;
(h) sending a notification to the first mobile electronic device by the server, wherein the notification indicates the second mobile electronic device has paid for the software application;
(i) transmitting an installation file of the software application from the first mobile electronic device to the second mobile electronic device; and
(j) installing the software application in the second mobile electronic device according to the installation file of the software application and the installation record of the software application.

6. The method of claim 5, wherein the installation record comprises a system file of the software application, a system configuration file of the software application, and startup items of the software application.

7. The method of claim 5, wherein each of the first mobile electronic device and the second mobile electronic device is a mobile phone or a personal digital assistant (PDA).

8. A non-transitory computer-readable storage medium storing a set of instructions, the set of instructions capable of being executed by a processor to perform a software installing method using a first mobile electronic device and a second mobile electronic device, the method comprising:
(a) recording an installation record of a software application of the first mobile electronic device and generating an installation list of the software application in the first mobile electronic device, wherein the installation list comprises a serial number of the first mobile electronic device, a name of the software application and version information of the software application;
(b) transmitting the installation list of the software application from the first mobile electronic device to a server;
(c) accessing the installation list of the software application in the server by the second mobile electronic device;
(d) sending a request for installing the software application from the second mobile electronic device to the server;
(e) determining by the server if the software application is available at no cost;
(f) wirelessly sending a notification for a payment to the second mobile electronic device, in response to the determination that the software application is not available at no cost;
(g) sending a feedback by the second mobile electronic device to the server to confirm the payment;
(h) sending a notification to the first mobile electronic device by the server, wherein the notification indicates the second mobile electronic device has paid for the software application;
(i) transmitting an installation file of the software application from the first mobile electronic device to the second mobile electronic device; and
(j) installing the software application in the second mobile electronic device according to the installation file of the software application and the installation record of the software application.

9. The medium of claim 8, wherein the installation record comprises a system file of the software application, a system configuration file of the software application, and startup items of the software application.

10. The medium of claim 8, wherein each of the first mobile electronic device and the second mobile electronic device is a mobile phone or a personal digital assistant (PDA).

* * * * *